Feb. 25, 1947.  C. R. NALLE  2,416,532
CASTER MOUNTING
Filed Nov. 12, 1943
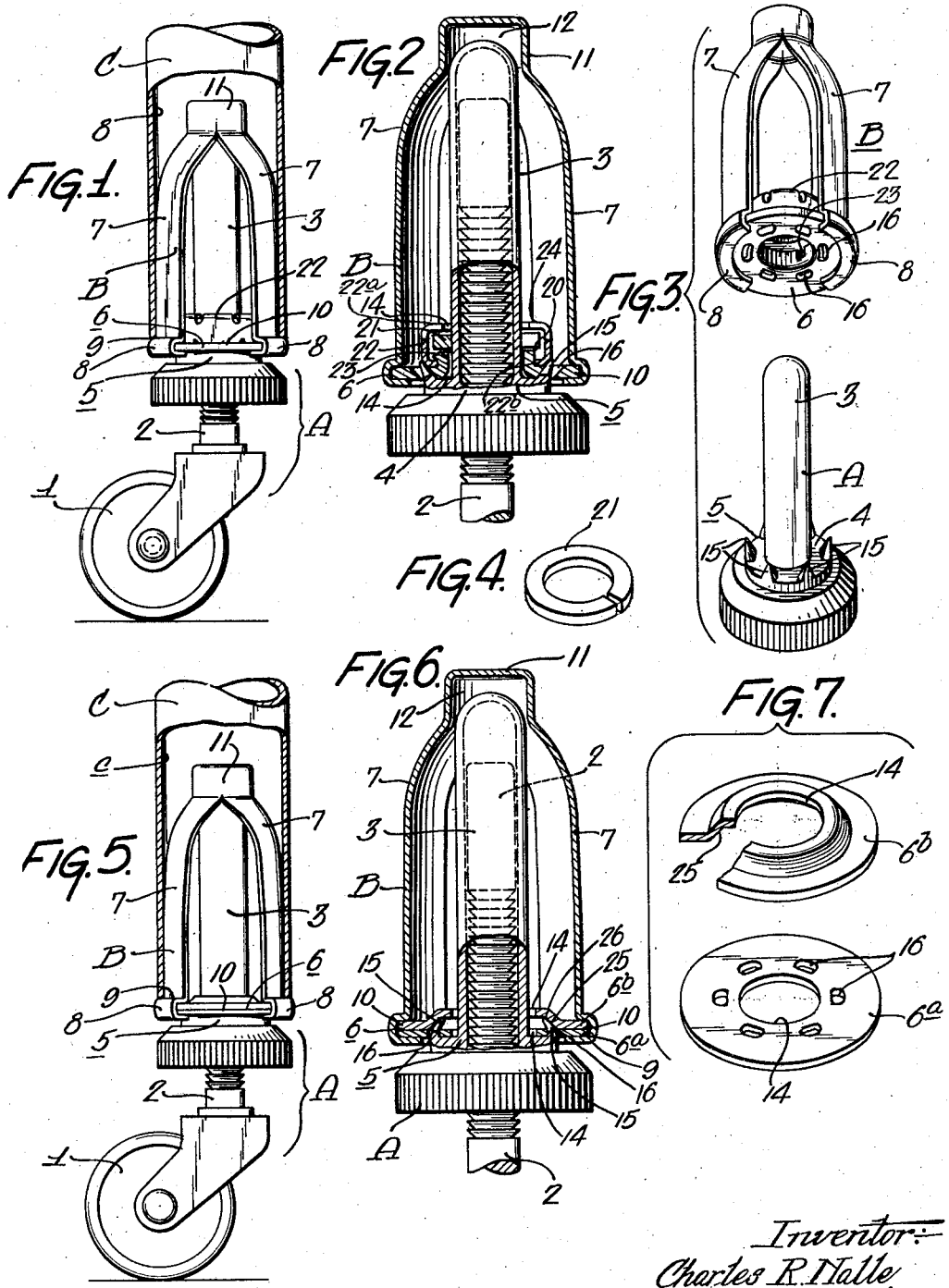
Inventor:-
Charles R. Nalle,
by his Attorneys
Howson & Howson Patented Feb. 25, 1947

2,416,532

UNITED STATES PATENT OFFICE 2,416,532

CASTER MOUNTING

Charles R. Nalle, Philadelphia, Pa.

Application November 12, 1943, Serial No. 510,023

11 Claims. (Cl. 16—39)

This invention relates to casters for articles of furniture, and other pieces of household, commercial and institutional equipment, etc., and particularly to adjustable casters of the general type disclosed in my prior United States Letters Patent No. 2,335,074, dated November 23, 1943.

The caster structure disclosed in the aforesaid patent, and others of its kind, is adapted primarily for use with articles provided with wooden legs, into the bottoms of which a series of prongs, forming part of the caster structure, are adapted to be driven, to maintain the caster structure, as a whole, in place.

The principal object of the present invention is to provide an adapter, for use with any adjustable caster or glide, for example, such as the caster structure of the aforesaid patent, by which the same caster structure may be used in hollow legs, formed of metal or other suitable material, with which any of the various articles to be supported may be equipped.

As shown in the accompanying drawing:

Fig. 1 is a partial longitudinal sectional view of a hollow leg of an article to be supported, with the adapter of the present invention shown therein as supporting a caster structure of the same general character as that disclosed in the aforesaid prior patent;

Fig. 2 is a longitudinal sectional view through the caster structure per se, and the adapter in accordance with the present invention;

Fig. 3 is a detached perspective view of the caster structure and the adapter;

Fig. 4 is a detailed perspective view of one of the elements of the adapter shown in Fig. 2;

Fig. 5 is a view, similar to Fig. 1, illustrating a modified form of the invention;

Fig. 6 is a view, similar to Fig. 2, of the modified form of the invention shown in Fig. 5; and Fig. 7 is a detached perspective view of a pair of elements forming the base member of the adapter shell, shown in Figs. 5 and 6.

As shown in the aforesaid prior patent, and in Figs. 1 and 5 of the present drawing, the primary caster structure A includes a roller, glide, or other floor engaging element 1, mounted on the lower end of a caster stem 2. The caster stem 2 passes upwardly into an elongated neck 3 which forms part of a stem socket 5.

The stem socket 5 is provided, at its lower end, with a head member 4, which preferably is formed as an integral part of the elongated neck 3. The head 4 of the primary caster structure A is adapted to lie adjacent a base member 6 of the adapter B, which forms the basis of the present invention.

The adapter B is adapted to fit snugly within the lower end of a tubular or other hollow leg C, within which the adapter is adapted to be frictionally held by means of resilient arms 7, 7, of the adapter B, exerting a radially outward force against the inner wall c of the hollow leg C.

The arms 7, 7, in the present instance, are secured, at their lower ends, to the base member 6 of the adapter B, by the extremities 8, 8 of the arms 7, 7 being bent outwardly, then downwardly around and then inwardly under the marginal edge portion of an annular flange or rib 10 formed on the base member 6, whereby the outwardly bent portions of said arm extremities 8, 8 afford an annular shoulder 9 on which the lower end of the tubing of the leg C rests.

At their upper ends, the arms 7, 7 are integrally united, in the present instance, and collectively form an inverted cup-like body 11. The cup-like body 11 is adapted to provide a recess or cavity 12, in axially spaced relation to the base member 6, for the reception of the upper end of the elongated neck 3 of the caster stem socket 5.

The neck 3 passes through a central aperture 14 formed in the base member 6 of the adapter shell B, which latter is formed by said base member 6, the arms 7, 7 and the body 11, collectively.

As shown particularly in Fig. 3, the head 4 of the primary caster structure A is provided with a series of prongs 15. These prongs, preferably, are circularly and uniformly spaced about the axis of the neck 3. The prongs 15 are adapted to project upwardly into a series of openings 16 which are formed in the underside of the base 6 of the shell B, and which are correspondingly spaced circularly about the axis of the aperture 14, for primarily maintaining the primary caster structure A and shell B in a predetermined relationship, against relative rotation.

As shown in Figs. 1 and 2, the primary caster structure A is removably retained within the adapter shell B; while in the structure shown in Figs. 5 and 6, the primary caster structure A is fixedly retained within the adapter shell B.

As shown in Fig. 2, the base 6 of the adapter B is provided with an upturned annular flange 20, on the upper edge of which rests a split ring 21. The ring 21 is housed within a cage 22, between said upper edge of the flange 20 and an inturned flange or ears 22a formed on the upper end of the cage 22. The lower end of the cage 22 is provided with an inturned flange 22b and fits snugly around the flange 20 of the base 6. The upper edge of the flange 20 is peened or upset outwardly, at a number of circularly spaced places 23, over the flange 22b, to secure the cage 22 in place.

The ring 21, as shown in Figs. 2 and 3, is of rectangular cross section and the inside surface of the ring 21 is adapted to bear firmly but resiliently against the outside surface of the neck 3 of the primary caster structure A.

By the application of a reasonable amount of axially applied force, the neck 3 of the primary caster structure A may be moved through and relative to the ring 21, either to place the neck of the primary caster structure A in proper position within the adapter shell B, or to remove the neck 3 therefrom.

In the structure shown in Figs. 5 and 6, the base 6 of the adapter B is composed of a lower annular plate 6a, in which the prong openings 16 are formed, and a superposed plate 6b. The central portion of the upper plate 6b is offset axially to provide a circular upwardly and inwardly radially converging wall 25 above the circularly spaced openings 16, 16 in the lower plate 6a. The points or tips 26 of the prongs 15 are adapted to bear against the tapered wall 25, when inserting the neck 3 of the primary caster structure A in the adapter shell B, after which a relatively sharp blow applied to the primary caster structure A, in a direction axially thereof, will cause the tips 26 of the prongs 15 to be bent inwardly, by the tapered wall 25 of the plate 6b, thereby effecting a clinching of the prongs 15 over the upper edges of the openings 16, 16 of the lower plate 6a within the base 6. In this manner the primary caster structure A and the adapter B are permanently connected together as a unit.

It will be understood that the assembling of the adapter B and the primary caster structure A may be effected prior to such assemblage being inserted into the lower end of the hollow leg C, or the adapter B may first be driven into the lower end of the hollow leg C and the primary caster structure A subsequently inserted into the adapter B. In the latter case, the adapter shown in Fig. 2 and the adapter shown in Fig. 6 are assembled completely with the free ends of the arms 7 bent around and under the marginal edge of the base 6, after which the adapter is forced into the hollow leg C until the shoulder 9 bears against the end of the leg tubing.

The caster structure A is then placed in position with the neck 3 thereof inserted in the central opening 14 of the base 6 of the adapter B, and advanced axially until the head 4 of the caster structure A is adjacent the under side of the base 6 of the adapter B. The head 4 is then circularly adjusted until the prongs 15 on the head 4 are respectively aligned with the openings 16 in the base 6, whereupon the whole of the structure A is advanced axially of the neck 3.

In the case of the structure shown in Fig. 2, the axial advancement of the caster structure A is continued until the head 4 thereof contacts with the under side of the base 6 of the adapter B, after which the split ring 21 functions to grip the neck 3 and retain it in the adapter B against accidental displacement of the caster structure A relative to the adapter B.

In the case of the structure shown in Fig. 6, as the prongs 15 on the head 4 of the caster structure A enter the openings 16 in the base 6 of the adapter B, the tips 26 of the prongs 15 engage the convergent annular surface 25 of the upper plate 6b of the base 6, before the head 4 of the caster structure A engages the under side of the lower plate 6a of the base 6, whereupon a sharp blow struck against the under side of the caster structure A, axially thereof, effects clinching of the prongs 15 and the seating of the head 4 against the base 6.

In either instance, the stem 2 of the caster structure A may be inserted in the clutching mechanism of the adjustable caster structure A, either before or after the caster structure A is installed in the adapter B, preferably afterwards.

I claim:

1. A caster structure for supporting an article having a hollow leg, comprising a shell insertable in said leg and including a base member, a caster stem socket comprising an elongated neck adapted to project through an aperture formed in said base member and including a head member integral with said neck and adapted to lie adjacent said base member, and a prong on one of said members projecting into an opening formed in the other of said members to maintain said shell and socket in a predetermined relation to each other.

2. A caster structure for supporting an article having a hollow leg, comprising a shell insertable in said leg and including a base member at one end and a recess in axially spaced relation thereto, a caster stem socket including an elongated neck projecting through an aperture formed in said base member and into said recess, a head member on said socket at one end of said neck and lying adjacent said base member, and a prong on one of said members projecting into an opening formed in the other of said members to maintain said shell and socket in a predetermined relation to each other.

3. A caster structure for supporting an article having a hollow leg, comprising a shell insertable in said leg and including a base member at one end and an axially spaced bearing cavity at its opposite end, a caster stem socket including an elongated neck adapted to project through an aperture formed in said base member and into said cavity, said socket also including a head member integral with said neck and adapted to lie adjacent said base member, and a series of prongs circularly spaced around coinciding axes of said neck and said aperture and respectively projecting from one of said members into a corresponding series of openings formed in the other of said members to maintain said shell and socket in a predetermined relation to each other.

4. A caster structure for supporting an article having a hollow leg, comprising a shell insertable in said leg and including a base member at one end and an axially spaced bearing cavity at its opposite end, a caster stem socket and including an elongated neck adapted to project through an aperture formed in said base member and including a head member integral with said neck and adapted to lie adjacent said base member, a prong on one of said members projecting into an opening formed in the other of said members to maintain said socket against rotation relative to said shell, and means carried by said base member and engageable with a portion of said socket for retaining said shell and socket in predetermined axial relation to each other.

5. A caster structure for supporting an article having a hollow leg, comprising a shell insertable in said leg and including a base member at one end and an axially spaced bearing cavity at the opposite end, a caster stem socket including an elongated neck projecting through an aperture formed in said base member and into said cavity, a head member on said socket adjacent said base member, a prong on one of said members projecting into an opening formed in the other of said members to maintain said socket against rotation relative to said shell, and means carried by said base member and engageable with said neck for retaining said shell and said socket in predetermined axial relation to each other.

6. A caster structure for supporting an article having a hollow leg, comprising a shell insertable in said leg and including a base member at one end and an axially spaced bearing cavity at the opposite end, a caster stem socket including an elongated neck projecting through an aperture formed in said base member and into said cavity, a head member on said socket adjacent said base member, a prong on one of said members projecting into an opening formed in the other of said members to maintain said socket against rotation relative to said shell, and a split ring of rectangular cross section carried by said base member and encircling said neck with the inner peripheral surface of said ring in flat frictional contact with the outer surface of said neck to maintain said socket in predetermined axial relation to said shell.

7. A caster structure for supporting an article having a hollow leg, comprising a shell insertable in said leg and including a base member, a caster stem socket projecting through an aperture formed in said base member and including a head member adjacent said base member, a series of prongs circularly spaced about the axis of said socket and respectively projecting from said head into a corresponding series of openings formed in said base and circularly spaced around said aperture, and means carried by said base member for clinching said prongs to maintain said shell and socket in predetermined relationship.

8. A caster structure for supporting an article having a hollow leg, comprising a shell insertable in said leg and including a base member composed of a pair of annular superposed plates, a caster stem socket including an elongated neck projecting through aligned apertures respectively formed in said plates, a head member at one end of said neck and underlying the lowermost of said plates, a series of prongs circularly spaced about said neck and respectively projecting from said head into a corresponding series of openings formed in the lowermost of the plates, and an upwardly radially converging wall formed on the uppermost of said plates above said openings in said lowermost plate for clinching said prongs within said base member to maintain said shell and socket in predetermined relationship.

9. An adapter for a caster structure for supporting an article having a hollow leg, said adapter comprising a shell insertable in said leg and including a base member composed of a pair of annular superposed plates respectively provided with axially aligned apertures and a series of openings formed in the lowermost of said plates and circularly spaced around said aperture therein, and an upwardly radially converging wall formed on the uppermost of said plates above the openings in said lowermost plate for the purpose described.

10. An adapter for a caster structure adapted to support an article having a hollow leg and wherein said caster structure includes an elongated neck and at least one prong spaced laterally therefrom for preventing bodily rotation of said neck within said hollow leg; said adapter comprising a shell formed to enter said hollow leg and including a base at one end of the shell, said base having a central aperture for receiving said neck and at least one laterally spaced additional aperture for receiving said prong, and means within said shell for gripping said neck to prevent accidental withdrawal of said prong from said additional aperture in said base.

11. An adapter for a caster structure adapted to support an article having a hollow leg and wherein said caster structure includes an elongated neck and at least one prong spaced laterally therefrom for preventing bodily rotation of said neck within said hollow leg; said adapter comprising a shell formed to enter said hollow leg and including a base at one end of the shell, said base having a central aperture for receiving said neck and at least one laterally spaced additional aperture for receiving said prong, means within said shell for gripping said neck to prevent accidental removal thereof from the central aperture in said base, and means within said shell for clinching said prong relative to said base upon forcing said neck axially into said shell after contact of said prong with said clinching means.

CHARLES R. NALLE.

REFERENCES CITED

The following references are of record in the file of this patent:

UNITED STATES PATENTS

| Number | Name | Date |
|---|---|---|
| 1,620,658 | Herold | Mar. 15, 1927 |
| 2,227,271 | Noelting | Dec. 31, 1940 |
| 1,051,705 | Diss | Jan. 28, 1913 |
| 1,022,056 | Bassick | Apr. 2, 1912 |
| 759,408 | Tonini | May 10, 1904 |
| 659,857 | Nickel | Oct. 16, 1900 |
| 1,713,656 | Herold | May 21, 1929 |